April 23, 1929.  V. CASTORINA  1,710,569
FISHING APPARATUS
Filed July 9, 1928  2 Sheets-Sheet 1

Inventor
Vincenzo Castorina
By his Attorneys
Kenyon & Kenyon

April 23, 1929.  V. CASTORINA  1,710,569
FISHING APPARATUS
Filed July 9, 1928   2 Sheets-Sheet 2
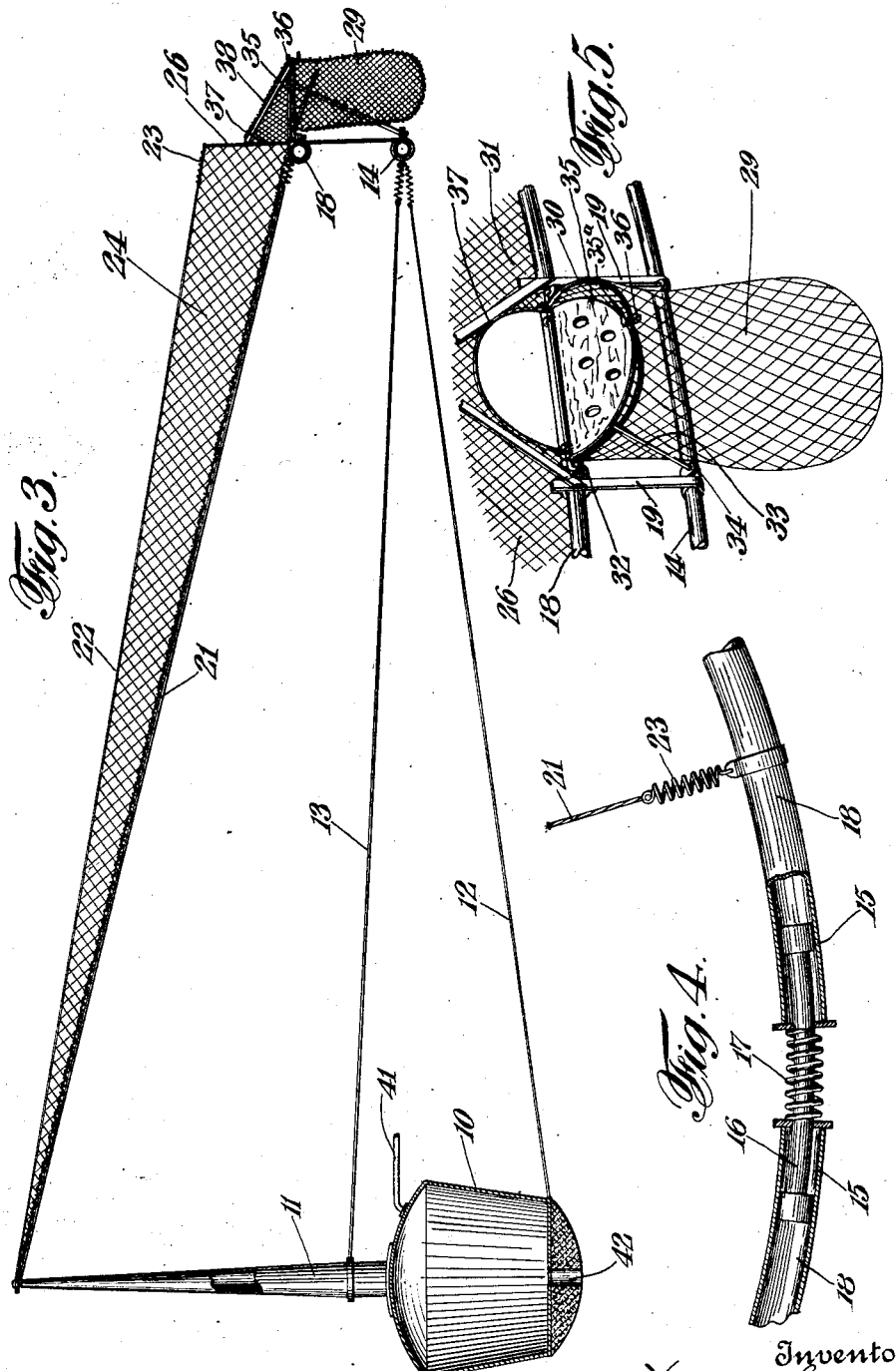

Patented Apr. 23, 1929.

1,710,569

UNITED STATES PATENT OFFICE.

VINCENZO CASTORINA, OF WEST NEW YORK, NEW JERSEY.

FISHING APPARATUS.

Application filed July 9, 1928. Serial No. 291,188.

This invention relates to fishing apparatus and has for an object an improved, efficient and easily operable fishing net.

The apparatus comprises essentially a jointed circular frame having centrally thereof an air chamber from which projects upwardly a central post. Cables extend radially from the top of this post to the periphery of the frame and alternate cables have their ends attached to the frame at different levels. The circular net overlies and is supported by the cables and being attached to the alternate cables provides radial troughs sloping downwardly toward the periphery of the frame. Basketlike nets are attached to the frame at the end of each trough and are provided with hinged covers of buoyant material.

The device is operated by introducing water into the air chamber to overcome the buoyancy of the device and cause same to sink. Air is then pumped into the chamber to restore the buoyancy and cause the device to rise. Any fish that are in the path of the device when rising are directed along the radial troughs and into the baskets at the ends of the troughs. After the device has reached the surface of the water these baskets are removed and others substituted after which the operation is repeated.

Other objects, novel features and advantages of this invention will be apparent from the following specification and accompanying drawings wherein:—

Fig. 3 is a vertical section of approximately half the device and

Figs. 4 and 5 are detailed views.

Figure 1:
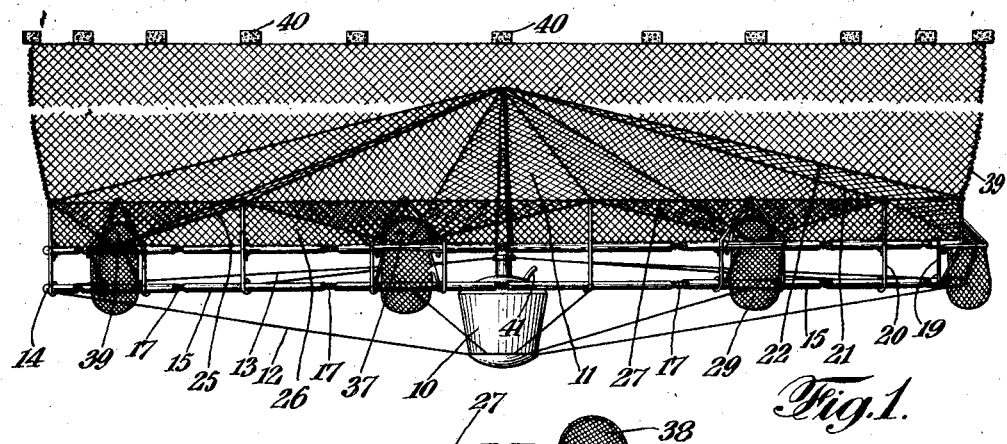
Fig. 1 is a side elevation of a device embodying the invention.
Figure 2:
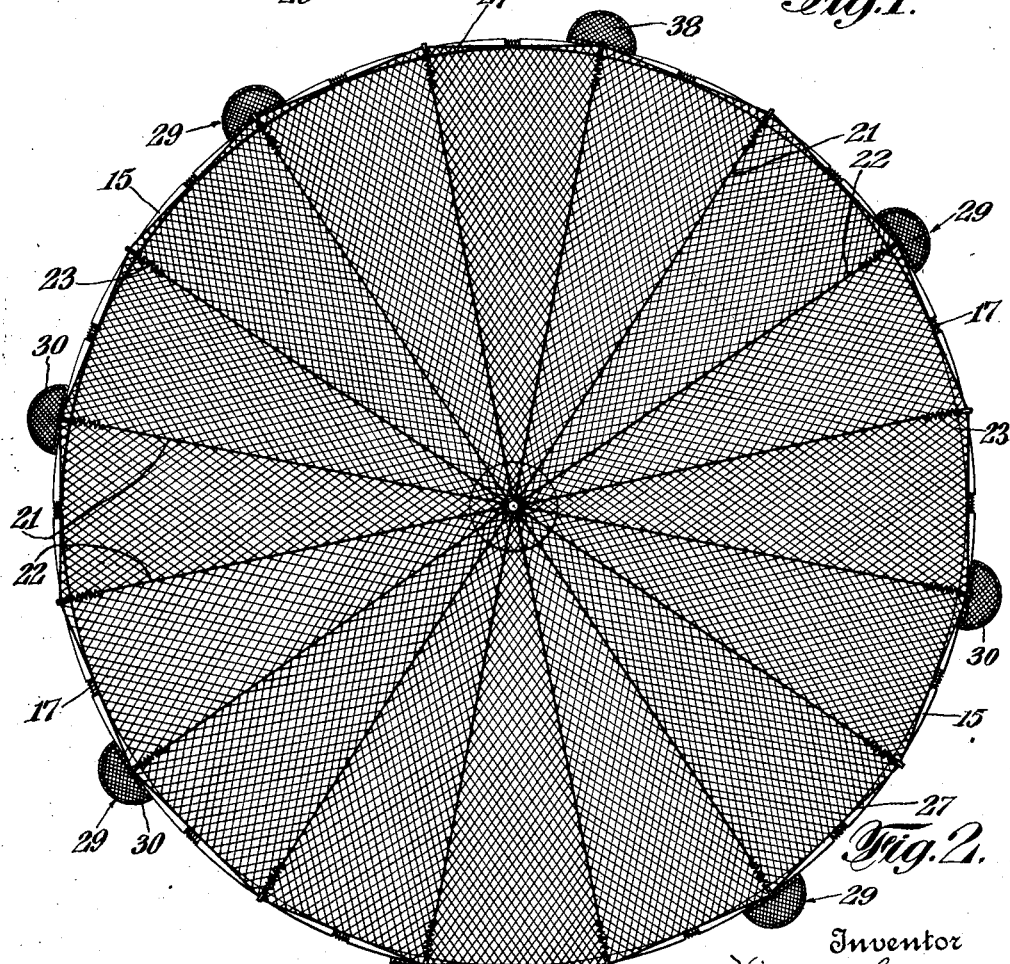
Fig. 2 is a plan view thereof.

The air chamber is designated by the reference character 10 and a hollow post 11 in communication with the chamber projects upwardly therefrom. Cables 12 and 13 lead from the chamber 10 and lower portion of the post 11 to a ring 14 made up of jointed sections 15 of pipe or the like. These sections of pipe are jointed by links 16 having heads slidably mounted in the pipes and are kept spaced one from the other by spiral springs 17 interposed between the ends of the sections and surrounding the links.

Similar ring 18 is supported from the ring 14 by struts 19 and 20, the latter of which project above the ring 18. Cables 21 and 22 lead from the top of the post 11 to the ring 18 and the tops of the struts 20 respectively, these cables being alternately arranged. The cables 12, 13, 21 and 22 are connected at their outer ends by means of springs 23, thus making the frame flexible.

A circular net 24 is draped over the cables 21 and 22 to form radial troughs sloping downwardly toward the ring 18. The periphery of the net is attached to a cable 25 passing through eyes at the upper ends of the struts 20 and connected to the ring 18 at the ends of the cables 21. A vertical net 26 is supported by the struts 25 and a cable 27 passing through the upper ends of the struts 20 and also supported by struts 28 forming a triangular arch at the ends of each radial trough.

Basketlike nets 29 are detachably supported by the frame at the ends of the radial troughs. Each net 29 has a frame 30, part of which comprises a rod 31 having depending ends fitting in sockets in collars 32 mounted on the ring 18. Arms 33 extending from the frame 30 have their ends seated in similar sockets in similar collars 34 mounted on the ring 14. This arrangement constitutes a detachable mounting for the baskets as they can be removed merely by lifting the frame 30 to remove the ends of 31 and 33 from their respective sockets. On the rod 31 is mounted a trap door 35 composed of wood, cork or other buoyant material, the upward movement of which is limited by the stop 35ª. A pivoted catch 36 is provided on the frame and may be used to lock the door 35 against downward movement when the basket is being removed from the frame. In the net 26 is provided an aperture 37 and a hood 38 extends therefrom and overlies the frame 30 of the basket 29.

A circular net 39 has one edge attached to the cable 27 and its other edge attached to floats 40. This net may be combined with a stationary fence net for leading fish into the space above the device when the latter is submerged. A hose 41 leads from the chamber 10 to a suitable pump means not shown for removing air from or introducing the same into the chamber 10 which is also provided with a passageway 42 to permit water to flow in or out of the chamber.

In the operation of this device air is exhausted from the chamber 10 and the post 11 allowing the latter to fill with water whereupon the apparatus is submerged.

After a suitable time has elapsed for fish to have been directed into the space above the apparatus, the water is expelled from the chamber 10 by pumping air there into and the apparatus lifted by the buoyancy thereof. As the apparatus moves upwardly the fish are directed by the radial troughs outwardly toward the periphery of the apparatus and eventually through the apertures 37 and into the baskets 29. The trap doors 35, while buoyant, do not offer any substantial resistance to the entry of fish into the baskets 29, but positively prevent escape of fish from such baskets. After the device has been raised to the surface and the fish collected in the baskets 29 the catch 36 is operated to lock the trap door 35 in closing position, the baskets are then removed and others substituted after which the operation is repeated.

As the various parts are connected by means of spring joints the entire device is very flexible, thus enabling it to resist the pressure of the water, neutralize the effect of the waves and reduce the amount of material used in building the same.

I claim:—

1. A fishing apparatus comprising a circular frame, pneumatic means for varying the buoyancy thereof, a net supported by said frame and forming radial troughs sloping downwardly toward the periphery of the frame, baskets detachably supported by the frame at the ends of the troughs and closures of buoyant material for said baskets.

2. A fishing apparatus comprising a circular frame, pneumatic means for varying the buoyancy thereof, a net supported by said frame and forming radial troughs sloping downwardly toward the periphery of the frame, baskets detachably supported by the frame at the ends of the troughs, closures of buoyant material for said baskets and locking means for said closures.

3. A fishing apparatus comprising a circular frame, pneumatic means for varying the buoyancy thereof, a net supported by said frame and forming a plurality of radial downwardly sloping troughs, means detachably mounted on said frame for receiving fish from said troughs and self closing closures for said receiving means.

4. A fishing apparatus comprising a circular frame, pneumatic means for varying the buoyancy thereof, a net supported by said frame and forming a plurality of radial downwardly sloping troughs, means detachably mounted on said frame for receiving fish from said troughs, self closing closures for said receiving means and means for locking said closures.

5. A fishing apparatus comprising a circular frame, an air chamber centrally of said frame, a post extending upwardly from said chamber, radial members extending from the top of said post to the periphery of said frame, a net supported by said members and forming a plurality of radial troughs sloping downwardly toward the periphery of the frame, baskets detachably supported by said frame at the ends of said troughs and closures of buoyant material for said baskets.

6. A fishing apparatus comprising a circular frame, an air chamber centrally of said frame, a post extending upwardly from said chamber, radial members extending from the top of said post to the periphery of said frame, a net supported by said members and forming a plurality of radial troughs sloping downwardly toward the periphery of the frame, baskets detachably supported by said frame at the ends of said troughs, closures of buoyant material for said baskets and locking means for said closures.

In testimony whereof, I have signed my name to this specification.

VINCENZO CASTORINA.